United States Patent Office 3,828,026
Patented Aug. 6, 1974

---

3,828,026
PROCESS FOR THE TEMPORARY PROTECTION OF CARBOXYL GROUPS
Robert Burns Woodward, 12 Oxford St., Cambridge, Mass. 02138
No Drawing. Continuation of application Ser. No. 856,457, Sept. 9, 1969, which is a continuation-in-part of application Ser. No. 573,800, Aug. 22, 1966, both now abandoned. This application June 1, 1972, Ser. No. 258,616
Claims priority, application Switzerland, Sept. 10, 1965, 12,623/65; Dec. 9, 1965, 16,970/65, 16,974/65, 16,976/65, 16,979/65, 16,980/65, 16,981/65
Int. Cl. C07d 99/16, 99/24
U.S. Cl. 260—239.1          6 Claims

ABSTRACT OF THE DISCLOSURE

The present invention concerns the temporary protection of a carboxyl group by esterifying the corresponding carboxylic acid with a 2,2,2-trihalogenoethanol, particularly 2,2,2-trichloroethanol, and subsequently splitting the ester grouping by treatment with a chemical reducing agent.

CROSS-REFERENCES TO RELATED APPLICATIONS

This is a continuation of application Ser. No. 856,457, filed Sept. 9, 1969, now abandoned, which is in turn a continuation-in-part of application Ser. No. 573,800, filed Aug. 22, 1966 (now abandoned).

BACKGROUND OF THE INVENTION

As is well known, the temporary protection of a free carboxyl group by esterification is of great importance in preparative chemistry, as well as in degradation reactions, for example, for determining the constitution of unknown compounds. It is, however, likewise known that the cleavage of an ester group often requires the use of reagents which during the liberation of the carboxyl group simultaneously affect the remaining molecule. Thus, esters of carboxyl groups formed with the generally used lower alkanols, such as methanol or ethanol, can be split only by using relatively strong bases, such as alkali metal hydroxides. Other esters, such as certain esters of carbonic acid derivatives, for example, tertiary butyloxycarbonyl groups, are split with the aid of strong acidic reagents, such as trifluoroacetic acid. Ester that can be split hydrogenolytically, such as those with benzylic alcohols, for example, benzyl alcohol, as well as carbobenzoxy groups, are converted into the free acids by treatment with catalytically activated hydrogen; these reagents differentiate to only a minor extent and can, therefore, easily modify a great number of reducible groupings present in the molecule.

On the other hand, carboxylic acid esters that are easy to split, such as the so-called "activated esters," for example, esters with electron-attracting groups, such as alcohols and phenols containing nitro or cyano groups, or esters with certain polyphenylmethanols, for example, diphenylmethanol, are often too reactive or insufficiently stable to be used for the temporary protection of acid groups.

The present invention is based on the observation that esters of carboxylic acids with a 2,2,2-trihalogenoethanol, in which the halogen atoms are identical or different, being primarily chlorine or bromine, as well as fluorine or iodine atoms, and advantageously 2,2,2-trichloroethanol, can be split in a very specific manner, namely by treatment with a chemical reducing agent. It has been observed that acid groups esterified in this manner are extremely stable and inert towards the most varied reactions and that the cleavage can be carried out selectively and with a minimum of interference with other groupings present in the molecule. Furthermore, reactions on the ester group itself, for example, transesterifications and similar reactions, may be carried out on 2,2,2-trihalogenoethyl esters in the usual manner.

SUMMARY OF THE INVENTION

Accordingly, the present invention provides a process for the temporary protection of a carboxyl group in carboxylic acids by esterification and subsequent clevage of the ester grouping, which comprises esterifying a carboxyl group in a carboxyl group-containing compound with a 2,2,2-trihalogenoethanol, especially 2,2,2-trichloroethanol, and subsequently cleaving the 2,2,2-trihalogenoethyl ester group to form a free carboxyl group by treatment with a chemical reducing agent.

DESCRIPTION OF THE PREFERRED EMBODIMENTS

The esterification of the carboxylic acid with a 2,2,2-trihalogenoethanol, especially 2,2,2 - trichloroethanol, is carried out in a known manner, for example, by using a reactive acid derivative, such as an acid halide or anhydride. According to a preferred modification, the ester is obtained by treating the free acid compound with a 2,2,2-trihalogenoethanol, especially with 2,2,2-trichloroethanol, in the presence of a suitable condensing agent, such as a carbodiimide, for example, dicyclohexylcarbodiimide, or a suitable carbonyl compound, for example, carbonyldiimidazole, as well as an acid, for example, a hydrohalic, e.g. hydrochloric acid or para-toluenesulphonic acid. The desired ester is also accessible by treating a salt, such as a metal salt, for example, an alkali metal salt, of the acid with a reactive ester of a 2,2,2-trihalogenoethanol, for example, an ester with a suitable mineral acid, such as a hydrohalic acid, or a strong organic sulphonic acid, such as an alkanesulphonic or arylsulphonic acid.

The cleavage of an ester with a 2,2,2-trihalogenoethanol, especially with 2,2,2-trichloroethanol, is advantageously carried out by treatment with a chemical reducing agent under mild conditions, generally at room temperature or with cooling. Such agents are primarily reducing metals, metal alloys or metal amalgams, which upon reaction with a hydrogen donor yield nascent hydrogen. Such reducing metal compounds are primarily zinc, a zinc alloy, for example, zinc-copper, or zinc amalgam, which are preferably used in the presence of an acid, such as an organic carboxylic acid, for example, a lower alkanecarboxylic acid, especially acetic acid, or an alcohol, such as a lower alkanol, for example, methanol or ethanol; furthermore, alkali metal amalgams, such as sodium or potassium amalgam, or aluminium amalgam, preferably used in the presence of a moist solvent, such as ether or a lower alkanol.

The above esters may also be split by treatment with an alkali metal, for example, lithium, sodium or potassium, or an alkaline earth metal, for example, calcium, used in liquid ammonia, if desired or required, with the addition of an alcohol, such as a lower alkanol.

An ester with a 2,2,2-trihalogenoethanol, such as 2,2,2-trichloroethanol, may likewise be converted into the free acid by treatment with a strongly reducing metal salt, such as a compound of divalent chromium, for example, chromium-II-chloride or acetate, preferably in an aqueous medium containing a water-miscible organic solvent, such as a lower alkanol, a lower alkanecarboxylic acid or an ether, for example, methanol, ethanol, acetic acid, tetrahydrofuran, dioxan, ethyleneglycol dimethyl ether or diethyleneglycol dimethyl ether.

Any carboxylic acid capable of forming a 2,2,2-trihalogenoethyl ester, particularly the 2,2,2-trichloroethyl ester may be used in the process of temporarily protecting a carboxyl group according to the present invention. Such acids are, for example aliphatic carboxylic acids, for example, optionally substituted alkane, alkene or alkyne carboxylic acids, cycloaliphatic carboxylic acids, for example, optionally substituted cycloalkane or cycloalkene carboxylic acids, cycloaliphatic-aliphatic carboxylic acids, for example, optionally substituted cycloalkylalkane, cycloalkenylalkane, cycloalkylalkene or cycloalkenylalkene carboxylic acids, aromatic carboxylic acids, such as optionally substituted benzene, naphthalene, anthracene or phenanthrene carboxylic acids, as well as optionally substituted cyclopenta[a]phenanthrene or naphthacene carboxylic acids and corresponding polyhydro compounds, araliphatic carboxylic acids, such as optionally substituted phenylalkane, phenylalkene, phenylalkyne, naphthylalkane or phenanthrylalkane carboxylic acids, as well as optionally substituted cyclopenta[a]phenanthrylalkane, cyclopenta[a]phenanthrylalkene or cyclopenta[a]phenanthrylalkyne carboxylic acids or the corresponding polyhydro compounds, heterocyclic carboxylic acids, such as optionally substituted monocyclic, bicyclic, tricyclic or tetracyclic monoazocyclic, diazacyclic, triazacyclic, tetraazacyclic, monothiacyclic, monooxacyclic, thiazacyclic, thiadiazacyclic, oxazacyclic or oxadiazacyclic carboxylic acids, or heterocyclic-aliphatic carboxylic acids, such as optionally substituted alkane or alkene carboxylic acids, which contain optionally substituted monocyclic, bicyclic, tricyclic or tetracyclic monoazacyclic, diazacyclic, triazacyclic, tetraazacyclic, monothiacyclic, monooxacyclic, thiaazacyclic, thiadiazacyclic, oxazacyclic or oxadiazacyclic residues, as well as carbonic acid compounds, such as half-esters of carbonic acid or carbamac acids, in which the nitrogen atom may be substituted.

Optional substituents of the above acids may be any conceivable type of substituent, for example, functional groups, such as free, etherified or esterified hydroxy or mercapto groups, e.g. alkoxy, alkenyloxy, alkylenedioxy, aryloxy, aralkoxy, alkylmercapto, arylmercapto, aralkylmercapto, alkanoyloxy, aroyloxy or aralkanoyloxy groups or halogen atoms, acyl groups, such as alkanoyl, aroyl or aralkanoyl groups, free or functionally modified formyl groups, e.g. dialkoxymethyl or dialkanoyloxymethyl groups, free or functionally modified carboxyl or sulfo groups, such as carbalkoxy, optionally substituted carbamyl, cyano or alkylsulfonyl groups, optionally substituted amino or imino groups, e.g. alkylamino, dialkylamino, hydroxyalkylamino, alkyleneamino, azaalkyleneamino, oxaalkyleneamino, thiaalkyleneamino, guanylamino or alkylimino groups, or nitro groups, or optionally substituted hydrocarbon groups, such as those mentioned above, or halogeno alkyl groups, for example, trifluoromethyl groups, or any other type of functional or optionally substituted hydrocarbon group.

The process of the present invention is particularly useful for the temporary protection of the carboxyl group in 4-thia-1-aza-2-bicyclo[3,2,0]heptane carboxylic acids, which may be optionally substituted, primarily by two methyl groups in 3-position, one or two oxo groups in 4-position, an optionally acylated amino group in 6-position and an oxo group in 7-position, as well as in 5-thia-1-aza-2-bicyclo[4,2,0[octane carboxylic acids, which are preferably unsaturated having a double bond in 2,3- as well as in 3,4-position, i.e. a 5-thia-1-aza-2-bicyclo[4,2,0]oct-2-ene carboxylic acid or a 5-thia-1-aza-2-bicyclo-[4,2,0]oct-3-ene carboxylic acid, and substituted, primarily in 3-position by a group $R_2$, which represents an optionally substituted methyl group, in which substituents are lower alkanoyloxy, e.g. acetyloxy groups, oxo groups or a quaternary ammonium, e.g. pyridiminum groups, in 7-position by an optionally acylated amino group and by an oxo group in 8-position.

Such carboxylic acids are more especially 3,3-dimethyl-6-N-$R_1$-amino-7-oxo-4-thia-1-aza - 2 - bicyclo[3,2,0] heptane carboxylic acids (e.g. 7-N-$R_1$-amino penicillanic acids), 3,3-dimethyl-6-N-$R_1$-amino - 4,7 - dioxo-4-thia-1- aza-2-bicyclo[3,2,0]heptane carboxylic acids (e.g. 4-oxo-7-N-$R_1$-amino penicillanic acids), 3-$R_2$-7-N-$R_1$-amino-8-oxo - 5 - thia-1-aza-2-bicyclo[4,2,0]oct-2-ene carboxylic acids (e.g. 3 - desacetyloxymethyl - 3-$R_2$-7-N-$R_1$-amino cephalosporanic acids) or 3-$R_2$-7-N-$R_1$-amino-8-oxo-5-thia-1-aza-2-bicyclo[4,2,0]oct-3-ene carboxylic acids (e.g. 3-desacetyloxymethyl - 3-$R_2$-7-N-$R_1$ - amino-isocephalosporanic acids), in which R represents hydrogen or the acyl residue Ac of a carboxylic acid, including of a carbonic acid compound, such as those mentioned below, and $R_2$ has the previously given meaning.

An acyl radical Ac may primarily be any type of acyl radical present in pharmacologically active 6-N-Ac-aminopenicillanic acid compounds and 7-N-Ac-amino-cephalosporanic acid compounds, as well as any acyl residue, particularly of a carbonic acid half ester, which is easily removable, for example, under acidic conditions, such as in the presence of a strong organic carboxylic or sulfonic acid, e.g. trifluoroacetic or p-toluene sulfonic acid. Such acyl residues are, for example, those represented by the radical of the formula X—$(C_mH_{2m})$—CO—, wherein $m$ represents an integer from 0 to 4, preferably 1, and in which a carbon atom, preferably the $\alpha$-carbon atom of a usually unbranched alkylene radical of the formula $$—(C_mH_{2m})—$$

may be substituted by a free, etherified or esterified hydroxyl or mercapto group, such as lower alkoxy or halogeno, a free or functionally converted carboxyl group, such as carbo-lower alkoxy or cyano, an optionally substituted amino group or a nitro group, and wherein X stands for an optionally substituted aromatic or cycloaliphatic hydrocarbon radical or an optionally substituted heterocyclic radical, the latter preferably of aromatic character, substituents being for example, those mentioned for the above alkylene radical, as well as by sulfo groups, or for an etherified hydroxyl or mercapto group, the etherifying portion being, for example, an optionally substituted aromatic or cycloaliphatic hydrocarbon radical or an optionally substituted heterocyclic radical, the latter preferably of aromatic character, for example a 2,6-dimethoxy - benzoyl, 3-pyridyl-benzoyl, tetrahydronaphthoyl, 2-methoxy-naphthoyl, 2-ethoxy-naphthoyl, phenylacetyl, phenyloxyacetyl, phenylthioacetyl, 2 - phenyloxypropionyl, 3-phenyloxy-propionyl, bromophenyl-thioacetyl, $\alpha$-phenyloxyphenylacetyl, $\alpha$-methoxy-phenylacetyl, $\alpha$-methoxy-3,4-dichlorophenylacetyl, $\alpha$-cyano-phenylacetyl, 4-chlorophenyl-$\alpha$-cyano-acetyl, phenylglycyl or phenylalanyl (optionally having a protected amino group), benzylthioacetyl, benzylthiopropionyl, benzyloxycarbonyl, hexahydrobenzyloxycarbonyl, cyclopentanoyl, cyclohexanoyl, $\alpha$-aminocyclopentanoyl or $\alpha$-amino-cyclohexanoyl (optionally having a protected amino group), 2-pyridylacetyl, 3-pyridylacetyl, 1-methyl - 2 - imidazolyl-thioacetyl, 1,2,4-triazol-3-yl-thioacetyl, 2-imidazolinyl-thioacetyl, 1-methyl-3-imidazolyl-acetyl, 1-imidazolyl-acetyl, 2-thienylacetyl, $\alpha$-cyano-2-thienylacetyl, $\alpha$-amino-2-thienylacetyl (optionally having a protected amino group), 3-thienylacetyl, 2-furylacetyl, 2-phenyl-5-methylisoxazolyl-carbonyl, 2-(2-chlorophenyl)-5-methyl-isoxazolylcarbonyl or 2-thiazolinyl-thioacetyl group, by a radical of one of the formulae $C_nH_{2n+1}CO$— and $C_nH_{2n-1}CO$—, wherein $n$ represents an integer up to 7, and the chain can be straight or branched and/or optionally interrupted by an oxygen or sulfur atom and/or substituted, for example, by esterified hydroxy groups, such as halogen atoms, free or functionally modified carboxyl, such as carbolower alkoxy or cyano, optionally substituted amino or nitro groups, for example, propionyl, butyryl, hexanoyl, octanoyl, acrylyl, crotonyl, 2-pentenoyl, butylthioacetyl, allylthio-acetyl, chloroacetyl, difluoroacetyl, dichloroacetyl, dibromoacetyl, 3-chloro-propionyl, 3-bromopropionyl, ethoxycarbonylacetyl, 2-carboxypropionyl, cyanoacetyl, $\alpha$-cyanopropionyl, 2-cyano-3,3-dimethyl-acrylyl, aminoacetyl or nitroacetyl group, or by a radical of the formula or nitroacetyl group, or by a radical of the formula Y—NH—CO—, wherein Y denotes an optionally substituted aliphatic or aromatic hydrocarbon, particularly a lower alkyl radical, preferably substituted by lower alkoxy groups and/or halogen atoms. Preferred acyl groups representing the above group Ac are monocyclic arylacetyl or aryloxyacetyl radicals, as well as a lower alkanoyl or alkenoyl radical, e.g. phenylacetyl, 4-hydroxyphenylacetyl, phenyloxyacetyl, hexanoyl, heptanoyl or 2-hexenoyl radical, or an acyl radical, which is easily removable, preferably under acidic conditions, such as upon treatment with a strong organic carboxylic or sulfonic acid, e.g. trifluoracetic or p-toluene sulfonic acid, as well as by hydrogenolysis, such as an acyl residue of a half ester of carbonic acid, in which the α-carbon atom is preferably branched, for example, corresponding carbolower alkoxy, e.g. carbo-tert.-butyloxy or carbo-tert.-pentyloxy radicals, carbo-cycloalkoxy, for example, carbo-adamantyloxy radicals, carbo-phenyl-lower alkoxy, for example, carbo-diphenylmethoxy radicals, or carbo-furyl-lower alkoxy, for example, carbo-furfuryloxy-radicals.

The invention also comprises any new compound described herein. These are primarily the 6-amino-penicillanic acid 2,2,2-trichloroethyl ester and its sulfoxide, and the N-acyl derivatives of these esters.

The following example illustrate the invention.

EXAMPLE 1

1 gram of freshly prepared chromous acetate is added to a solution of 0.5 g. of L-2,2-dimethyl-3-tertiary butyloxycarbonyl-thiazolidine-4-carboxylic acid-2,2,2 - trichloroethyl ester in 10 ml. of acetic acid and 3 ml. of water. The reaction mixture is stirred for 2 hours under carbon dioxide at room temperature and then diluted with 100 ml. of ether and 80 ml. of water. The whole is filtered, and the aqueous phase separated and extracted with 80 ml. of ether. The ethereal extracts are twice washed with water, combined, dried and evaporated. The residue thus obtained is dissolved in 40 ml. of ether, the solution extracted with 2× 20 ml. of 0.2N-sodium hydroxide solution, and the alkaline extracts are washed with ether, acidified with crystalline citric acid and extracted with 3 × 40 ml. of methylene chloride. The organic extracts are washed with water, dried and evaporated, to yield crystalline L-2,2-dimethyl-3-tertiary butyloxycarbonyl-thiazolidine-4-carboxylic acid, which melts at 115 to 177° C. after having been recrystallized from pentane. Optical rotation $[\alpha]_D = -77° \pm 1°$ (c.=0.835 in chloroform).

The starting material is accessible, for example, in the following manner:

A solution of 4.55 g. of an L-2,2-dimethyl-3-tertiary butyloxycarbonyl-thiazolidine - 4 - carboxylic acid (obtained, for example, by the process described in patent application Ser. No. 573,816, filed Aug. 22, 1966, and 10 g. of trichloroethanol in 10 ml. of methylene chloride and 6 drops of pyridine is mixed with a solution of 3.62 g. of dicyclohexylcarbodiimide in 10 ml. of methylene chloride. After 16 hours the dicyclohexylurea formed is filtered off, the filtrate evaporated and the residue treated with benzene. The insoluble portion is filtered off, and the filtrate adsorbed on 240 g. of a diatomaceous earth preparation. The desired L-2,2-dimethyl-3-tertiary butyloxycarbonyl-thiazolidine - 4 - carboxylic acid-2,2,2-trichloroethyl ester is eluted with benzene. When left to stand, the product crystallizes in the form of colorless rodlets from aqueous methanol; it melts at 69 to 71° C. Optical rotation $[\alpha]_D^{20} = 70°$ (c.=1 in chloroform). Infrared absorption bands at 5.70 and 5.94μ.

EXAMPLE 2

1.5 grams of zinc dust are added to a solution of 0.14 g. of L-2,2-dimethyl-3-tertiary butyloxycarbonyl-thiazolidine-4-carboxylic acid-2,2,2-trichlorethyl ester in 3.5 ml. of aqueous acetic acid of 90% strength and the whole is stirred for 4 hours at room temperature. The residue is filtered off and washed with 4 ml. of acetic acid. The filtrate is diluted with 200 ml. of benzene and washed with 5× 35 ml. of water. The organic solution is evaporated under a water-jet vacuum and the residue recrystallized from pentane, to yield L-2,2-dimethyl-3-tertiary butyloxycarbonylthiazolidine-4-carboxylic acid, melting at 113 to 115° C.

The product obtained in this manner may be further worked up, for example, as disclosed in patent applications Ser. Nos. 573,815, 573,816, 573,865 and 573,891, all filed Aug. 22, 1966, and Ser. Nos. 784,193 and 784,255, both filed Dec. 16, 1968.

EXAMPLE 3

1.5 grams of zinc dust are added to a solution of 0.14 g. of L-2,2-dimethyl-3-tertiary butyloxycarbonyl-5β-acetyloxy-thiazolidine-4-carboxylic acid-2,2,2 - trichloroethyl ester [prepared, for example, by the processes described in patent applications Ser. Nos. 573,816 and 573,-891, both filed Aug. 22, 1966] in 3.5 ml. of acetic acid of 90% strength; the reaction mixture is stirred for 4 hours at room temperature, then filtered, the residue washed with 4 ml. of acetic acid and 200 ml. of benzene, and the filtrate is washed 5 times with water, dried over magnesium sulphate and evaporated. The residue crystallizes on trituration with a mixture of pentane and ether and is recrystallized from ether+pentane. The resulting L-2,2-dimethyl-3-tertiary butyloxycarbonyl-5β-acetyloxy-thiazolidine-5-carboxyilc acid sublimes at 127° C. under 0.001 mm. Hg and then melts at 145 to 146°. Optical rotation $[\alpha]_D^{20} = +225°$ (c.=0.93 in chloroform). Infrared absorption bands in methylene chloride at 5.75, 5.90 and 8.25μ.

The product obtained in this manner may be further worked up, for example, by the processes disclosed in patent applications Ser. Nos. 573,815, 573,865 and 573,-891, all filed Aug. 22, 1966, and Ser. No.s 784,193 and 784,255, both filed Dec. 16, 1968.

EXAMPLE 4

A solution of the mixture prepared as described below in 200 ml. of glacial acetic acid and 20 ml. of water is stirred with 60 g. of zinc dust for 3 hours at room temperature. The mixture is then filtered and the filter residue washed with 60 ml. each of glacial acetic acid and benzene. The filtrate is evaporated under 0.5 mm. Hg pressure, the residue dissolved in 600 ml. of ether and the solution washed with 600 ml. of water, the aqueous phase being rinsed with ether. The combined ethereal solutions are further washed twice with water, dried and evaporated, and the residue is dissolved in ether, treated with an active carbon preparation and crystallizes from ether+pentane, to yield L-2,2-dimethyl-3-tertiary butyloxycarbonyl-5β-acetyloxythiazolidine-4-carboxylic acid, melting at 146 to 147° C.

The mother lqiuor is evaporated and the residue dissolved in methylene chloride and extracted with an aqueous sodium bicarbonate solution. The basic extract is acidified with citric acid and extracted with methylene chloride. Fractional crystallization from pentane+ether yields the L-2,2-dimethyl-3-tertiary butyloxycarbonyl-5α-acetyloxy-thiazolidine-4-carboxylic acid, melting at 171 to 171.5° C. Optical rotation $[\alpha]_D^{20} = -346° \pm 1°$ (c.=0.925 in chloroform). Infrared absorption band in methylene chloride at 2.87, 3.15, 5.75, 5.90, 5.96, 7.25, 8.25, 8.63 and 10.66μ and in addition a substantial proportion of a crystalline mixture of the two acids.

The product obtained in this manner may be further worked up, for example, by the processes described in patent applications Ser. Nos. 753,815, 573,865 and 573,-891, all filed Aug. 22, 1966, and Ser. Nos. 784,198 and 784,255, both filed Dec. 16, 1968.

The starting material used above is accessible, for example, by the following route:

A mixture of 11.82 g. of L-2,2-dimethyl - 3 - tertiary butyloxycarbonyl-5β-(N,N′-dicarbomethoxy - hydrazino)- thiazolidine-4-carboxylic acid-2,2,2-trichloroethyl ester [prepared, for example, according to the process described in patent application Ser. No. 573,816, filed Aug. 22, 1966] in 150 ml. of benzene and 24.4 g. of lead tetraacetate is boiled gently for 45 minutes, then cooled, filtered and evaporated under reduced pressure. The yellow, oily residue, which contains the L-2,2-dimethyl-3-tertiary butyloxycarbonyl-5-acetyloxy-5 - carbomethoxy-azo-thiazolidine-4-carboxylic acid - 2,2,2 - trichloroethyl ester, is taken up in 200 ml. of warm hexane, filtered and the filtrate is evaporated. The residue is dissolved in 250 ml. of benzene, mixed with 100 g. of a diatomaceous earth preparation (Florisil) and 5 ml. of ethyl acetate, and stirred for 80 minutes, then filtered, and the filtrate evaporated, to yield a crude mixture of L-2,2-dimethyl-3-tertiary butyloxycarbonyl-5α-acetyloxy-thiazolidine - 4-carboxylic acid-2,2,2-trichloroethyl ester and its 5β-acetyloxy isomer, of which a further quantity can be obtained by eluting the adsorbent with benzene.

EXAMPLE 5

1 gram of freshly prepared moist chromous acetate is added to a solution of 0.5 g. of 3-desacetyl-3-formyl-7-(2-thienylacetylamino) - isocephalosporanic acid-2,2,2 - trichloroethyl ester in a mixture of 10 ml. of acetic acid and 3 ml. of water, and the mixture is stirred for 3 hours at room temperature under carbon dioxide, and then diluted with 100 ml. of ether and 80 ml. of water. The mixture is filtered, the aqueous phase separated and extracted with ether, and the combined ethereal solutions are washed with 3× 60 ml. of water. When the dried ethereal solution is evaporated, it furnishes the corresponding acid as a crude product.

The starting material can be prepared, for example, as follows:

A mixture of 58.5 g. of d-tartaric acid and 312 g. of 2,2,2-trichloroethanol in 150 ml. of toluene, containing 10 g. of a strongly acidic ion exchange resin (strongly acidic cation exchange resin for analytical purposes, made by Messrs. Merck, Darmstadt, Germany, which had previously been washed for 20 minutes with 2N-sulphuric acid, then with 2 litres of water and with toluene) is heated for 171/2 hours at a bath temperature of 140° C., while removing the water formed in a water separator. Another 80 g. of 2,2,2-trichloroethanol are added and the mixture is once more heated for 28 hours, during which a total of 20.3 ml. of water separates. The batch is filtered through a filtering assistant which is after-rinsed with toluene, and the filtrate is concentrated at 40° C. under 10 mm. Hg pressure; the excess 2,2,2-trichloroethanol is distilled off at 58° C. under 0.2 to 0.5 mm. Hg pressure and the residue is stirred in 1 litre of a 7:1-mixture of benzene and ethyl acetate for 30 minutes with 300 g. of silica gel containing 5% of water. After filtration and rinsing with ½ litre of the solvent mixture the filtrate is evaporated and the residue crystallized from 200 ml. of ether by the dropwise addition of 75 ml. of pentane, to yield d-tartaric acid-di-2,2,2-trichloroethyl ester, melting at 100 to 103° C., which is rinsed with a 1:7-mixture of ether and pentane. A further quantity of the desired ester may be obtained from the mother liquor.

The 2,2,2-trichloroethyl ester obtained in this manner is then converted into the desired starting material, for example, by the processes described in patent applications Ser. Nos. 573,866 and 573,886, both filed Aug. 22, 1966.

EXAMPLE 6

0.6 gram of zinc dust is added portionwise during the course of 30 minutes to a solution of 0.15 g. of 7-(2-thienylacetylamino)-isocephalosporanic acid - 2,2,2 - trichloroethyl ester in 24 ml. of aqueous acetic acid of 90% strength. The reaction mixture is stirred for 2 hours at room temperature and then centrifuge. The resulting solution is repeatedly evaporated with the addition of toluene each time, and the residue is agitated with 5 ml. of water and 25 ml. of ethyl acetate while dropping in 2N-hydrochloric acid until the pH has reached a value of about 2. The organic phase is washed 3 times with saturated sodium chloride solution, dried and evaporated and the residue crystallized from a mixture of benzene and ethyl acetate, to yield 7-(2-thienylacetylamino)-isocephalosporanic acid, melting at 147 to 151° C. Optical rotation $[\alpha]_D^{20} = +440° \pm 3°$ (c.=0.364 in chloroform). Infrared absorption bands in potassium bromide at 2.95, 3.06, 5.75, 5.82, 6.05 and 5.56μ.

The starting material used is accessible, for example, by the processes described in patent applications Ser. Nos. 573,866 and 573,866, both filed Aug. 22, 1966. The resulting product can be further processed, for example, by the process described in patent application Ser. No. 573,876, filed Aug. 22, 1966.

EXAMPLE 7

1.8 grams of zinc dust are added portionwise to a solution of 0.3 g. of 7-[D-5-(carbo-2,2,2-trichloroethoxy)-5-(2,2,2 - trichloroethoxy-carbonylamino)-valerylamino]-cephalosporanic acid 2,2,2-trichloroethyl ester [prepared, for example, by the processes described in patent applications Ser. Nos. 573,866, 573,876 and 573,886, all filed Aug. 22, 1966] in 7.2 ml. of acetic acid of 90% strength and the whole is stirred for 2 hours at room temperature. The whole is centrifuged, the supernatant clear solution evaporated, and the residue is dissolved in 0.5 ml. of water and filtered through a column of 2 g. of an ion exchange resin (Amberlite IR 45; acetate form). The column is rinsed with 20 ml. of water, and the filtrate run through 5 g. of a further ion exchange preparation (Dowex 50 X12) and evaporated under vacuum. The crude product yields cephalosporin C, which decomposes at 173 to 175° C. after recrystallization from water and acetone. Infrared absorption bands in paraffin oil at 2.94, 3.06, 5.77, 6.05, 6.29, 6.57, 7.17, 7.36 and 7.61μ.

The product can be isolated and purified in a known manner via the barium salt.

Paper-chromatography in the system n-butanol+acetic acid+water (5:1:4), n-propanol+ethyl acetate+water (7:1:2) and n-propanol+water (7:1) reveals that the product is identical with cephalosporin C obtained by fermentation.

Alternatively, it may be of advantage to perform the above reduction of 7-[D-5-(carbo-2,2,2-trichloroethoxy)-5 - (2,2,2-trichloroethoxy-carbonylamino)-valerylamino]-cephalosporanic acid-2,2,2-trichloroethyl ester with zinc in acetic acid of 90% strength at 0° C.

EXAMPLE 8

0.4 gram of zinc dust is added portionwise during the course of 30 minutes to a solution of 0.1 g. of 7-(2-thienylacetylamino)-cephalosporanic acid-2,2,2-trichloroethyl ester [prepared, for example, by the processes described in patent applications Ser. Nos. 573,866, 573,876 and 573,886, all filed Aug. 22, 1966] in 1.8 ml. of aqueous acetic acid of 90% strength, and the reaction mixture is stirred for 2 hours at room temperature and then centrifuged. The clear solution is repeatedly evaporated, each time with the addition of toluene, and the residue is agitated with 5 ml. of water and 25 ml. of toluene, and 2N-hydrochloric acid is dropped in until the aqueous phase has reached a pH value of about 2. The organic solution is washed 3 times with saturated sodium chloride solution, dried and evaporated and the residue crystallized from benzene+ethyl acetate, to yield 7-(2-thienylacetylamino)-cephalosporanic acid, melting at 160 to 160.5° C. Optical rotation $[\alpha]_D^{20} = +50°$ (c.=1.03 in acetonitrile). Infrared absorption bands in potassium bromide at 3.10, 5.65, 5.75, 6.05 and 6.55μ. Ultraviolet absorption bands in ethanol: $\lambda_{max.}$ 239 mμ ($\epsilon$=13,600) and 262 mμ ($\epsilon$=7,750).

EXAMPLE 9

2 grams of zinc dust are stirred portionswise during the course of 5 minutes into a solution of 0.26 g. of L - 2,2 - dimethyl - 3 - tertiary butyloxycarbonyl - 5α-azido-thiazolidine-4-carboxylic acid-2,2,2 - trichloroethyl ester [prepared by the process described in patent application Ser. No. 573,865, filed Aug. 22, 1966] in 8 ml. of aqueous acetic acid of 90% strength. The reaction mixture is stirred for 2½ hours at room temperature and then filtered, the residue washed with 2 ml. of glacial acetic acid and 5 ml. of methylene chloride, and the filtrate is evaporated. The residue is repeatedly stirred with methylene chloride, and the organic solution is washed with 10 ml. of water, dried and evaporated. The residue contains a mixture of L-2,2,-dimethyl-3-tertiary butyloxycarbonyl-5α-amino-thiazolidine-4-carboxylic acid of the formula

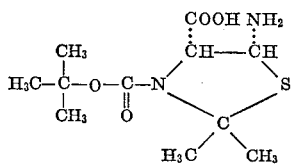

and 2,2 - dimethyl - 3 - tertiary butyloxycarbonyl-4-thiazolidine-4-carboxylic acid of the formula

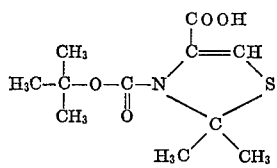

A solution of the crude product in methylene chloride is extracted with 3× 20 ml. of an aqueous citric acid solution of 20% strength. The acid extracts are adjusted with sodium carbonate to a pH value of about 5, and the aqueous solution is extracted with 3× 20 ml. of methylene chloride, dried and evaporated, to yield amorphous L-2-2-dimethyl-3-tertiary butyloxycarbonyl-5α-amino - thiazolidine-4-carboxylic acid, whose infrared absorption spectrum (in methylene chloride) reveals band at 2.84, 2.93, 5.76, 5.90, 7.37 and 8.63μ. It is worked up further as described in patent application Ser. No. 573,815, filed Aug. 22, 1966.

EXAMPLE 10

A solution of 0.121 g. of L-2,2-dimethyl-3-tertiary butyloxycarbonyl-5α-azido-thiazolidine - 4 - carboxylic acid-2,2,2-trichloroethyl ester in 10 ml. of methanol is cooled to −20° C. and treated with 0.5 g. of aluminum amalgam. The reaction mixture is stirred for 55 hours at −20° C., then for 22 hours at 0° C. and for 18 hours at +25° C. The undissolved matter is filtered off, dissolved in an aqueous tartaric acid solution and extracted with methylene chloride, to yield L-2,2-dimethyl-3-tertiary butyloxycarbonyl-5α-aminothiazolidine-4-carboxylic acid, which is identical with the product described in Example 9, and in addition tartaric acid.

The above examples illustrate primarily the use of 2,2,2-trihalogenethyl esters for the temporary protection, of carboxyl groups in the synthetic manufacture of 7-aminocephalosporanic acid and its derivatives, such as esters and amides, by means of ring systems instable towards various chemical reagents, especially alkaline agents, first disclosed in patent applications Ser. Nos. 573,815, 573,-816, 573,865, 573,866, 573,876, 573,886, 573,890 and 573,891, all filed Aug. 22, 1965, and Ser. Nos. 784,193 and 784,255, both filed Dec. 16, 1968.

EXAMPLE 11

0.4 gram of zinc dust is added portionwise during the course of 30 minutes to a solution of 0.1 g. of 6-(N-phenyloxyacetylamino) - penicillanic acid-2,2,2-trichloroethyl ester in 1.8 ml. of aqueous acetic acid of 90% strength, and the reaction mixture is stirred for 2 hours at room temperature and then centrifuged. The solution is worked up as described in Example 8 to yield penicillin V, to which an aqueous solution of sodium hydroxide of 1% strength is added until the neutral point has been reached and is precipitated from the resulting solution with hydrochloric acid to a pH value of 1.7. After having been washed with water the product melts at 120 to 128° C.

The starting material may be prepared in the following manner:

0.252 gram of dicyclohexylcarbodiimide is stirred into a suspension of 0.25 g. of 6-amino-pencillanic acid in 3 ml. of 2,2,2-trichloroethanol, 3 ml. of absolute acetonitrile and 0.1 ml. of absolute pyridine, and the reaction mixture is stirred for a further 18 hours. The N,N'-dicyclohexylurea is filtered off and washed with benzene; the filtrate is evaporated to dryness with 5× 20 ml. of xylene at 30 to 40° C. under 11 mm. Hg pressure, the residue taken up in benzene filtered until all the N,N-dicyclohexylurea has been removed and then rinsed with benzene. The filtrate is dissolved in a 1:1-mixture of benzene and ethyl acetate and chromatographed on 50 g. of silica gel. The column is prepared in the same solvent mixture, and fractions of 25 ml. each are collected. After having washed out by-products with a total of 150 ml. of 25:25-, 24:26- and 23:37-mixtures of benzene and ethyl of acetate, elution with 100 ml. of 22:28- and 21:29-mixtures of the same solvent mixture furnishes the 6-amino-penicillanic acid-2,2,2-trichloroethyl ester of the formula

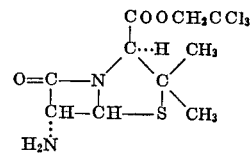

whose infrared absorption spectrum (in methylene chloride) contains bands at 2.95, 5.64, 5.70, 6.70, 7.35, 7.80, 8.33, 8.53, 8.72, 8.89, 9.27 and 9.75μ.

The amino ester obtained in this manner is acylated in a known manner, for example by treatment of a solution of 7.5 g. of the 6-amino-penicillanic acid-2,2,2-trichloroethyl ester in methylene chloride with an appropriate proportion of phenoxyacetyl chloride in methylene chloride in the presence of triethylamine. The reaction mixture is extracted with ice-cold dilute hydrochloric acid, and the organic phase is washed neutral and evaporated. The residue (about 10 g.) is taken up in benzene and chromatographed on 200 g. of silica gel. After a preliminary washing with 200 ml. of benzene and 800 ml. of 95:5- to 90:10-mixtures and with 200 ml. of an 87.5:12.5-mixture and 100 ml. of an 85:15-mixture of benzene and ethyl acetate, there is obtained pure 6 - (N - phenyloxyacetylamino)-penicillanic acid-2,2,2-trichloroethyl ester of the formula

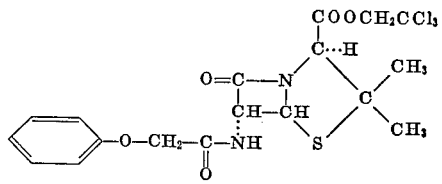

by elution with 100 ml. of the 85:15-mixture, 200 ml. of a 82.5:17.5-mixture and 200 ml. of an 80:20-mixture of benzene and ethyl acetate. The product crystallizes from benzene+cyclohexane at −18° C. and is recrystallized from benzene+ethyl acetate. It melts at 84 to 86° C. Optical rotation $[\alpha]_D = +122°$ (c.=0.900 in chloroform). Infrared absorption spectrum (in methylene chloride) contains bands at 2.95, 5.61, 5.69, 5.94, 6.30, 6,63, 6.72, 7.32, 8.15, 8.35, 8.53, 8.70, 9.26, 9.45, 9.75 and 11.3μ.

EXAMPLE 12

0.4 gram of zinc dust is added portionwise to a solution of 0.1 g. of 6-(N-phenyloxyacetylamino) - penicillanic acid-2,2,2-trichloroethyl ester sulphoxide in 2 ml. of aqueous acetic acid of 90% strength, and the reaction mixture is stirred for 2 hours at room temperature and then centrifuged. The supernatant solution is worked up as described in Example 8, to yield penicillin V-sulphoxide which melts at 167 to 168° C. with decomposition on recrystallization from ethyl acetate+petroleum ether.

The starting material may be prepared as follows:

A solution of 4.55 g. of dicyclohexylcarbodiimide in 20 ml. of acetonitrile is stirred dropwise during the course of 15 minutes into a solution of 7 g. of penicillin V in 40 ml. of absolute acetonitrile, 40 ml. of trichloroethanol and 0.5 ml. of absolute pyridine. The batch is stirred for 48 hours, then filtered, the filter residue washed with benzene and pentane, and the filtrate is evaporated to dryness with 3× 200 ml., 2× 100 ml. and 1× 50 ml. of xylene at 40 to 50° C. under 11 mm. Hg pressure. The residue is taken up in benzene and filtered. The unreacted dicyclohexylacarbodidiimide is decomposed by stirring the batch for 1 hour with 40 ml. of xylene and 1 ml. of acetic acid. The residue is chromatographed on 200 g. of silica gel after having washed the column with 200 ml. of benzene and 800 ml. of 95:5- to 90:10-mixtures of benzene and ethyl acetate. The desired 6-(N-phenyloxyacetylamino)-penicillanic acid-2,2,2-trichloroethyl ester is eluted, as described in Example 9, with 100 ml. of the 85:15-minute, 200 ml. of an 82.5:17.5 mixture and 200 ml. of an 80:20-mixture of benzene and ethyl acetate. On recrystallization from ethyl acetate+benzene it melts at 84 to 86° C.

0.25 gram of crude meta-chloroperbenzoic acid of 85% strength in about 20 ml. of ether is stirred slowly, during the course of 35 minutes, into an ice-cold mixture of 0.533 g. of crude 6-(N-phenylacetylamino)-penicillanic acid-2,2,2-trichloroethyl ester in 30 ml. of absolute ether. The reaction mixture is kept for 24 hours at +7° C., then while being cooled with ice mixed with 0.2 g. of sodium sulphite and 20 ml. of a saturated sodium bicarbonate solution and agitated for about 5 minutes. The aqueous phase is extracted with 2× 3 ml. of methylene chloride, and the combined organic solutions are added dried over magnesium sulphate and evaporated. The resulting product is crystallized at +7° C. from a mixture of benzene and cyclohexane and then washed with a 1:1- mixture of the same solvents. After recrystallization from benzene +cyclohexane the 6 - (N-phenyloxyacetylamino)-penicillanic acid-2,2,2-trichloroethyl ester sulphoxide of the formula

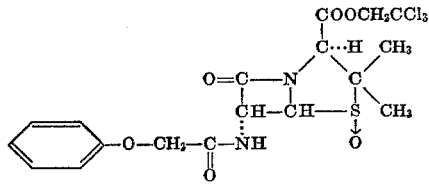

melts at 150 to 151.5° C. Optical rotation $[\alpha]_D = +147°$ (c.=0.775 in chloroform). Infrared absorption bands in methylene chloride at 2.93, 5.52, 5.65, 5.90, 6.25, 6.60, 6.70, 7.05, 7.30, 8.35, 8.68, 9.40, 9.60, 9.75 and 10.00μ.

Upon treatment of 6-(N-phenyloxyacetyl-amino)-penicillanic acid 2,2,2-trichloroethylester sulfoxide with a trace of p-toluene sulfonic acid in xylene at reflux temperature according to the procedure described in J. Am. Chem. Soc., vol. 85, p. 1896–1897 (1963), the 3-desacetyloxymethyl-3-methyl-7 - (N-phenyloxyacetyl-amino)-cephalosporanic acid 2,2,2-trichloroethyl ester is obtained, which is converted into the 3-desacetyloxymethyl-3-methyl-7-(N-phenyloxyacetyl-amino)-cephalosporanicacid according to the process of this invention, for example, by treatment with zinc in the presence of 90% aqueous acetic acid.

In a similar manner penicillin G can be converted into 3 - desacetyloxymethyl - 3 - methyl-7-(N-phenylacetylamino)-cephalosporanic acid by reacting penicillin G with 2,2,2-trichloroethanol in the presence of dicyclohexylcarbodiimide, treating the resulting 6 - (N - phenylacetylamino)-penicillanic acid 2,2,2-trichloroethyl ester with m-chloro-perbenzoic acid and reacting the resulting 6-(N-phenylacetyl-amino)-penicillanic acid 2,2,2-trichloroethyl ester sulfoxide with a trace of p-toluene sulfonic acid in xylene at reflux temperature.

A solution of 1.07 g. of the resulting 3-desacetyloxymethyl-3-methyl-6 - (N-phenylacetylamino)-cephalosporanic acid 2,2,2-trichloroethyl ester in 100 ml. of acetic acid, diluted with 10 ml. of water, is cooled to 0° C. and treated within 20 minutes with a total of 15 g. of zinc dust while stirring and cooling to 0° C. After stirring for an additional 20 minutes, the mixture is filtered, the unreacted zinc is washed with 30 ml. of acetic acid and the filtrate is evaporated under reduced pressure. The residue is taken up in water; 200 ml. of methylene chloride are added and the aqueous phase is acidified at 0° C. by adding concentrated hydrochloric acid. From the methylene chloride phase the crude 3-desacetyloxymethyl-3-methyl-7-(N-phenylaectyl-amino)-cephalosporanic acid can be isolated.

EXAMPLE 13

A solution of 1.75 g. of 6-amino-penicillanic acid 2,2,2-trichloroethyl ester is 85 ml. of 90% aqueous acetic acid is treated with a total of 12.8 g. of zinc dust, which is added over a period of 35 minutes and while cooling to 0° C. The reaction mixture is filtered, the residue is washed with acetic acid and the filtrate is concentrated under reduced pressure to a volume of about 10 ml. After diluting with 35 ml. of water, the pH is brought to about 4, and the reaction mixture is allowed to stand at 0° for 20 hours. The resulting crude 6-amino-penicillanic acid is filtered off, washed with aqueous methanol and dried under reduced pressure, $[\alpha]_D^{31} = +273°$ (in 0.1N hydrochloric acid).

The starting material may be prepared as follows:

A solution of 3 g. of 6-(N-phenylacetyl-amino)-penicillanic acid 2,2,2-trichloroethyl ester in 30 ml. of ethylene chloride is cooled to −60° C. and treated with 1.8 g. of phosphorus pentachloride. The reaction mixture is stirred at −40° C. to −50° C. for 2 hours, then cooled to −65° C. and rapidly treated with 0.4 ml. of N,N-dimethylaniline and 12.5 ml. of n-propanol. The reaction mixture is then diluted with 50 ml. of methylene chloride, the temperature is allowed to rise to 0° C. and 50 ml. of water are added. While stirring, the reaction mixture is treated with a 1N aqueous solution of sodium hydroxide until the pH of the aqueous phase reaches about 10. The organic phase is separated and washed with water, dried and evaporated. The crude 6-amino-penicillanic acid 2,2,2-trichloroethyl ester is purified by chromatography on silicagel as described in Example 11.

What is claimed is:

1. In a process for the production of a free acid from a carboxylic acid protected by esterification, the improvement wherein the 2,2,2-trichloroethyl or 2,2,2-tribromoethyl carboxylic acid ester, used as the carboxylic acid protected by esterification, is treated with, as the chemical reducing agent (1) a member selected from the group consisting of zinc, a zinc alloy and zinc amalgam in the presence of a lower alkane carboxylic acid or a lower alkanol, (2) a member selected from the group consisting of an alkali metal amalgam and aluminum amalgam in the presence of a moist solvent, (3) a member selected from the group consisting of an alkali metal and an alkaline earth metal in the presence of liquid ammonia and (4) a strongly reducing metal salt.

2. A process as claimed in claim 1, wherein 2,2,2-trichloroethyl ester is used as the 2,2,2-trihalogenoethyl carboxylic acid ester.

3. A process as claimed in claim 1, wherein zinc in the presence of acetic acid is used as the chemical reducing reagent.

4. A process as claimed in claim 7, wherein a salt of divalent chromium is used as the chemical reducing reagent.

5. Process according to claim 1, 2,2,2-trichloroethyl or wherein the 2,2,2-tribromoethyl carboxylic acid ester is that of a member selected from the group consisting of a 4-thia-1-aza-2-bicyclo[3,2,0]heptane carboxylic acid, a 5-thia-1-aza-2-bicyclo[4,2,0]octane carboxylic acid, a 5-thia-1-aza-2-bicyclo[4,2,0]oct-2-ene carboxylic acid and a 5-thia-1-aza-2-bicyclo[4,2,0]oct-3-enecarboxylic acid.

6. Process according to claim 1, wherein the 2,2,2-trichloroethyl or 2,2,2-tribromethyl carboxylic acid ester is that of a member selected from the group consisting of a 2,2-dimethyl-6-N-$R_1$-amino-7-oxo-4-thia-1-aza-2-bicyclo[3,2,0]heptane carboxylic acid, a 3,3-dimethyl-6-N-$R_1$-amino-4,7-dioxo-4-thia-1-aza-2-bicyclo[3,2,0]heptane carboxylic acid, a 3-$R_2$-7-N-$R_1$-amino-8-oxo-5-thia-1-aza-2-bicyclo[4,2,0]oct-2-ene carboxylic acid and a 3-$R_2$-7-N-$R_1$-amino-8-oxo-5-thia-1-aza-2-bicyclo[4,2,0]oct-3-ene carboxylic acid, in which $R_1$ is a member selected from the group consisting of hydrogen, lower alkanoyl, lower alkenoyl, phenylacetyl, 4-hydroxy-phenylacetyl, phenoxyacetyl, carbo-lower alkoxy, carbo-adamantyloxy, carbophenyl-lower alkoxy and carbo-furyl-lower alkoxy, and $R_2$ is a member selected from the group consisting of a methyl group and a methyl group substituted by a member selected from the group consisting of lower alkanoyloxy, oxo or a pyridinium group.

References Cited
UNITED STATES PATENTS

| | | | |
|---|---|---|---|
| 3,173,911 | 3/1965 | Hoover | 260—239.1 |
| 3,284,451 | 11/1966 | Cheney et al. | 260—239.1 |

OTHER REFERENCES

Grimshaw: J. Chem. Soc. (London), 1965, pp. 7136–7140.

NICHOLAS S. RIZZO, Primary Examiner

U.S. Cl. X.R.

260—243 C; 424—246, 271

PO-1050
(5/69)

UNITED STATES PATENT OFFICE  4-WO-1/V/CIP/CONT
CERTIFICATE OF CORRECTION

Patent No. __3,828,026__  Dated __August 6, 1974__

Inventor(s) __ROBERT BURNS WOODWARD__

It is certified that error appears in the above-identified patent and that said Letters Patent are hereby corrected as shown below:

Column 13, lines 7 and 8, after "claim 1," should read

-- wherein the 2,2,2-trichloroethyl or 2,2,2-tribromoethyl carboxylic acid ester is --;

line 15, delete "-tribromethyl" and insert

-- -tribromoethyl --.

Signed and sealed this 22nd day of October 1974.

(SEAL)
Attest:

McCOY M. GIBSON JR.
Attesting Officer

C. MARSHALL DANN
Commissioner of Patents df